US006840796B2

(12) United States Patent
Marcinkiewicz et al.

(10) Patent No.: US 6,840,796 B2
(45) Date of Patent: Jan. 11, 2005

(54) PORTABLE ELECTRONIC DEVICES WITH A FLEXIBLE CONNECTION BETWEEN INTERNAL ELECTRONICS AND AN AUXILIARY CONNECTION

(75) Inventors: Walter M. Marcinkiewicz, Apex, NC (US); Denise K. Sadler, Durham, NC (US)

(73) Assignee: Sony Ericsson Mobile Communications AB (SE)

( * ) Notice: Subject to any disclaimer, the term of this patent is extended or adjusted under 35 U.S.C. 154(b) by 0 days.

(21) Appl. No.: 10/456,322

(22) Filed: Jun. 6, 2003

(65) Prior Publication Data

US 2004/0248461 A1 Dec. 9, 2004

(51) Int. Cl.⁷ ................................................ H01R 9/07
(52) U.S. Cl. ...................................... 439/495; 455/558
(58) Field of Search ................................ 439/495, 638, 439/259, 76.1, 263, 590, 607; 379/144, 434, 433; 455/558, 556, 90.1–90.3, 557, 11.1, 575.1, 575.8; 316/550.1

(56) References Cited

U.S. PATENT DOCUMENTS

| | | | |
|---|---|---|---|
| 3,648,002 A | | 3/1972 | Du Rocher |
| 4,715,824 A | | 12/1987 | Verhoeven |
| 4,838,799 A | | 6/1989 | Tonooka |
| 5,006,286 A | | 4/1991 | Dery et al. |
| 5,335,273 A | * | 8/1994 | Takagi et al. .......... 379/433.13 |
| 5,433,616 A | | 7/1995 | Walden |
| 5,521,336 A | * | 5/1996 | Buchanan et al. ....... 178/18.03 |
| 5,711,013 A | * | 1/1998 | Collett et al. ............... 455/558 |
| 5,738,545 A | * | 4/1998 | Igarashi et al. ............. 439/607 |
| 5,846,094 A | | 12/1998 | Murray et al. |
| 6,089,905 A | | 7/2000 | Shimmyo et al. |
| 6,146,199 A | * | 11/2000 | Ortega et al. ............... 439/590 |
| 6,461,169 B1 | | 10/2002 | Harrison et al. |
| 6,461,181 B1 | | 10/2002 | Goh et al. |
| 2002/0186551 A1 | | 12/2002 | Murowaki et al. |

FOREIGN PATENT DOCUMENTS

| | | |
|---|---|---|
| DE | 198 02 552 A1 | 9/1998 |
| GB | 2 028 015 A | 2/1980 |
| WO | WO86/06551 | 11/1986 |

OTHER PUBLICATIONS

International Search Report and the Written Opinion of the International Searching Authority, PCT/IB2004/000112, Aug. 30, 2004.

* cited by examiner

*Primary Examiner*—Ross Gushi
*Assistant Examiner*—Phuongchi Nguyen
(74) *Attorney, Agent, or Firm*—Myers Bigel Sibley & Sajovec

(57) ABSTRACT

A portable electronic device includes a portable housing and an electrical circuit positioned in the housing. A connector assembly is positioned in a wall of the housing. The connector assembly includes an internal connector extending into the housing, and an auxiliary connector rigidly coupled to the internal connector and accessible from outside the housing. The auxiliary connector is electrically connected to the internal connector. A flexible member electrically connects the internal connector to the electrical circuit. The flexible member is configured to transmit less than about 10% of an external impact force on the connector assembly to the electrical circuit.

44 Claims, 10 Drawing Sheets

PORTABLE ELECTRONIC DEVICES WITH A FLEXIBLE CONNECTION BETWEEN INTERNAL ELECTRONICS AND AN AUXILIARY CONNECTION

BACKGROUND OF THE INVENTION

The present invention relates to the field of portable electronic devices in general and more particularly, to electrical connectors to internal electrical circuits of such portable electronic devices, such as mobile communication devices.

Portable electronic devices such as radiotelephones, personal data assistants (PDAs), smartphones, or other mobile device may include auxiliary connectors electrically coupling the portable device to an external accessory device, such as MPEG Audio Layer 3 ("MP3") players, radios, cameras, headsets or other such devices. The auxiliary connector is typically accessible from the outside of the portable device. For example, a flat spring contact can be used to connect an accessory device to the auxiliary connector for communications with the portable electronic device.

Auxiliary connectors are generally electrically connected to an electrical circuit, such as a printed circuit board, inside the housing of the portable device. This electrical connection is typically a solder or slide on design. Such solder or slide on connections are generally relatively tall, for example, 5 mm in height or larger, and their size may place constraints on the placement of the printed circuit board within the housing of the portable device. The placement of the circuit board may, in turn, limit the ability of these designs to meet the design requirements of smaller portable devices.

Solder and slide on connection designs may also become unreliable due to exposure to shock conditions (e.g., relatively high force impacts over a short time period) and/or normal wear and use (e.g., relatively low force impacts over a longer time period). Typically, solder joints bear some of the force that is impacted onto the auxiliary connector, and a solder joint configuration may not absorb the force of impact sufficiently to avoid damage. These impact forces can cause either fatigue of the solder joint and/or wear on the contact pads to the electrical circuit. In addition, a rugged mechanism may be required to hold the components together and such designs may lead to failure of the mechanical interfaces. The results of such conditions may be catastrophic.

SUMMARY OF THE INVENTION

Embodiments of the present invention include a portable electronic device including a portable housing and an electrical circuit positioned in the housing. A connector assembly is positioned in a wall of the housing. The connector assembly includes an internal connector extending into the housing, and an auxiliary connector rigidly coupled to the internal connector and accessible from outside the housing. The auxiliary connector is electrically connected to the internal connector. A flexible member electrically connects the internal connector to the electrical circuit. The flexible member is configured to transmit less than about 10% of an external impact force on the connector assembly to the electrical circuit.

Further embodiments of the present invention include a wireless terminal including a portable housing and an electrical circuit positioned in the housing. The electrical circuit includes a wireless communications circuit on a printed circuit board including a processor and a processor system bus. A connector assembly having a height less than about 5 mm is positioned in a wall of the housing. The connector assembly includes an internal connector extending into the housing and an auxiliary connector rigidly coupled to the internal connector and accessible from outside the housing. The auxiliary connector is electrically connected to the internal connector. The internal connector and the auxiliary connector each include a plurality of electrically isolated electrical contact points. The connector assembly includes a plurality of conductive members extending between respective ones of the electrical contact points and having a first end defining an electrical contact in the internal connector and a second end defining an associated electrical contact in the auxiliary connector. The electrical contact points in the auxiliary connector include compliant elastomer contacts. A flexible member electrically connects the internal connector to the electrical circuit. The flexible member is configured to transmit less than about 10% of an external impact force on the connector assembly to the electrical circuit.

In still further embodiments according to the present invention, a wireless terminal includes a portable housing and an electrical circuit positioned in the housing. The electrical circuit includes a wireless communications circuit on a printed circuit board including a processor and a processor system bus. A connector assembly having a height less than about 5 mm is positioned in a wall of the housing extending into the housing. The connector assembly includes a low insertion force connector, an auxiliary connector accessible from outside the housing and electrically connected to the low insertion force connector, and a unitary molded polymeric body member that rigidly couples the low insertion force connector and the auxiliary connector. A flexible member electrically connects the low insertion force connector to the electrical circuit. The flexible member is configured to transmit less than about 10% of an external impact force on the auxiliary connector to the electrical circuit. The low insertion force connector includes a first part and a second part. The second part is movable between a first position retaining the flexible member in the low insertion force connector and a second position releasing the flexible connection member from the low insertion force connector.

In further embodiments according to the present invention, a method for connecting a connector assembly having a low insertion force connector to a flexible member in a portable electronic device is provided. The portable electronic device includes a first housing portion and a second housing portion. A connector assembly is positioned in a wall of the first housing portion of the portable electronic device. The connector assembly includes a low insertion force connector comprising a first part and a second part. The second part is movable between a closed position and a open position. The connector assembly further includes an auxiliary connector rigidly coupled to the low insertion force connector and accessible from outside the housing. The auxiliary connector is electrically connected to the low insertion force connector. A flexible member is positioned between the first part and the second part of the low insertion force connector. The second housing portion of the portable electronic device is positioned on the first housing portion of the portable electronic device to move the second part of the low insertion force connector from the open position to the closed position retaining the flexible member in the low insertion force connector.

DETAILED DESCRIPTION

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Thicknesses and dimensions of some components may not be drawn to scale and may be exaggerated for clarity.

Figure 1:
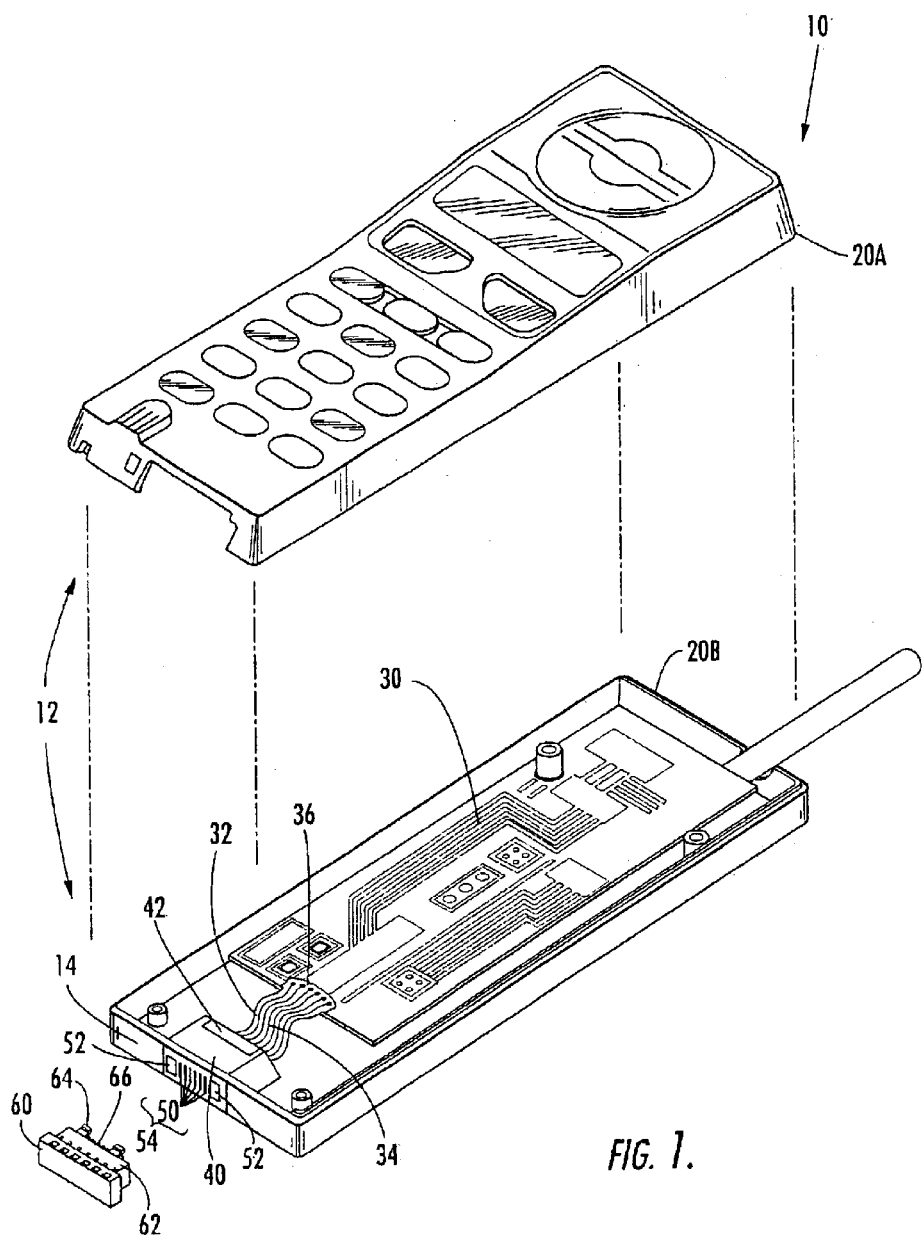
FIG. 1 is an exploded perspective view of a portable electronic communications device according to some embodiments of the present invention.

Embodiments of the present invention will now be described with reference to the illustration of a mobile terminal 10 in FIG. 1. As shown in FIG. 1, the mobile terminal 10 includes a portable housing 12 having a top portion 20A and a bottom portion 20B. An electrical circuit 30 is positioned in the housing 12. The electrical circuit 30 can be a printed circuit board having a wireless communications circuit that can include a processor and a processor system bus.

A connector assembly 40 is positioned in a wall 14 of the bottom housing portion 20B. The connector assembly 40 provides an interface between the electrical circuit 30 (e.g., a processor system bus) and an auxiliary device 60 by way of a flexible connector 32. Examples of accessory devices include MPEG Audio Layer 3 ("MP3") players, radios, cameras, headsets and other devices that may be configured to interface with a mobile wireless terminal 10 or other portable electronic device. The connector assembly 40 has an auxiliary connector 54 that is accessible from outside of the housing 12 to provide a connection to the auxiliary device 60 and, through an internal connector 42 and flexible connector 32, a connection to the electrical circuit 30.

As illustrated in FIG. 1, the flexible connector 32 includes flexible conductive electrical leads (or traces) 34 that are electrically connected to the electrical circuit 30 via electrical contact termination points 36. Any suitable flexible connector can be used, such as a flexible printed circuit. With a flexible printed circuit, the height of the electrical connection between the internal connector 42 and the electrical circuit 30 may be reduced relative to conventional solder joint connections. For example, the height of the connector assembly 40 can be 5.5 mm, 4 mm, 3 mm or less.

The internal electrical connection may also have increased durability compared to conventional solder joint connections. The flexible connector 32 is compliant and can mechanically absorb and/or dissipate some of the energy from any impact to the exposed surface of the connector assembly 40. For example, if the mobile terminal 10 experiences a force of impact on the connector assembly 40, the flexible connector 32 may decouple a portion of the energy from the impact force to the electrical circuit 30. In certain embodiments, the flexible connector 32 transmits less than about 10% of an external impact force on the connector assembly 40 to the electrical circuit 30.

The auxiliary connector 54 includes auxiliary contacts 50 and latches 52. The auxiliary contacts 50 are electrically coupled to the internal connector 42. The auxiliary device 60 includes a mating connector 62 that includes latches 64 and metal contacts 66. The latches 64 on the mating connector 62 mechanically connect with the latches 52 on the auxiliary connector 54 to help maintain an electrical connection between the metal contacts 66 and the auxiliary contacts 50. Accordingly, an electrical connection is formed between the auxiliary device 60 and the electrical circuit 30 of the mobile terminal 10.

The internal connector 42 can be any connector configured to form an electrical connection with the flexible connector 32. Examples of suitable internal connectors include low insertion force connectors. Low insertion force connectors typically provide a force on a connector lead after insertion to maintain an electrical connection while also reducing the force on the lead during insertion. As used herein, low insertion force connectors include connectors referred to as "zero" insertion force connectors. Alternatively, the internal connector 42 can be a snap-type connector or a connector using anisotropic conductive adhesive to electrically connect to the flexible connector 32. The auxiliary contacts 50 can be any suitable contact for forming a connection with the mating connector 62, such as a flat spring interface, a metal spring connector, or a compliant elastomer contact.

Figure 2:
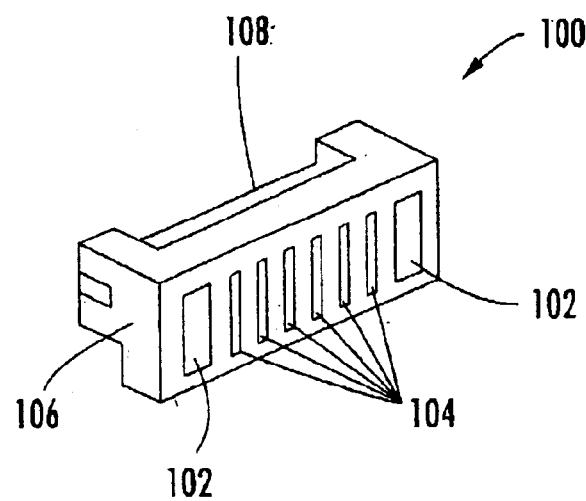
FIG. 2 is perspective view of a connector assembly according to some embodiments of the present invention.
Figure 3:
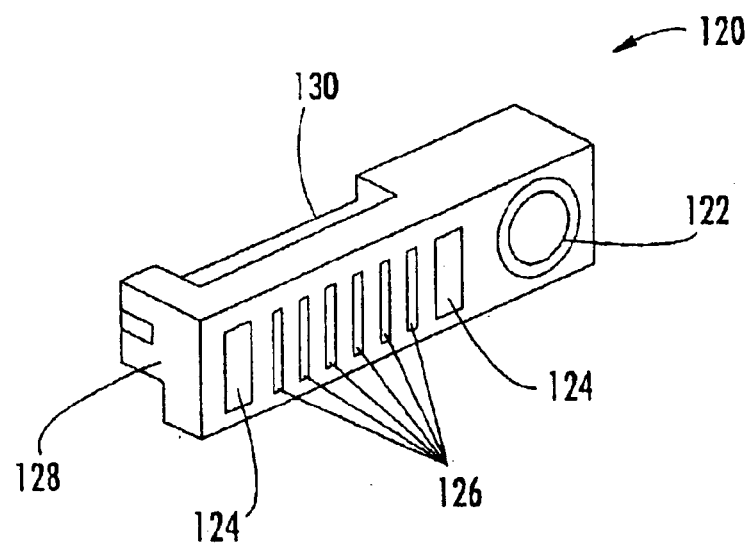
FIG. 3 is a perspective view of a connector assembly according to further embodiments of the present invention.

FIGS. 2 and 3 illustrate embodiments of the present invention showing the auxiliary connector side of connector assemblies 100 and 120, respectively. The connector assembly 100 includes six auxiliary contacts 104 and two latches 102 on the auxiliary connector side and an internal connector 108, which are incorporated in a unitary housing 106.

Any number of auxiliary contacts 104 can be used. The internal connector 108 is rigidly coupled to the auxiliary contacts 104 by the housing 106. The connector assembly 120, as illustrated, includes six auxiliary contacts 126, two latches 424, and a terminal 122 on the auxiliary connector side and an internal connector 130. The terminal 122 can be, for example, an audio jack or a power jack or other accessory terminal connector that may be routed inside the housing separately or together with the other electrical connections. A unitary housing 128 incorporates the auxiliary contacts 126, the latches 124, the internal connector 130 and the jack 122 and maintains a rigid coupling between the auxiliary connector and the internal connector 130. The housings 106 and 128 can be a unitary molded polymeric body.

Figure 4:
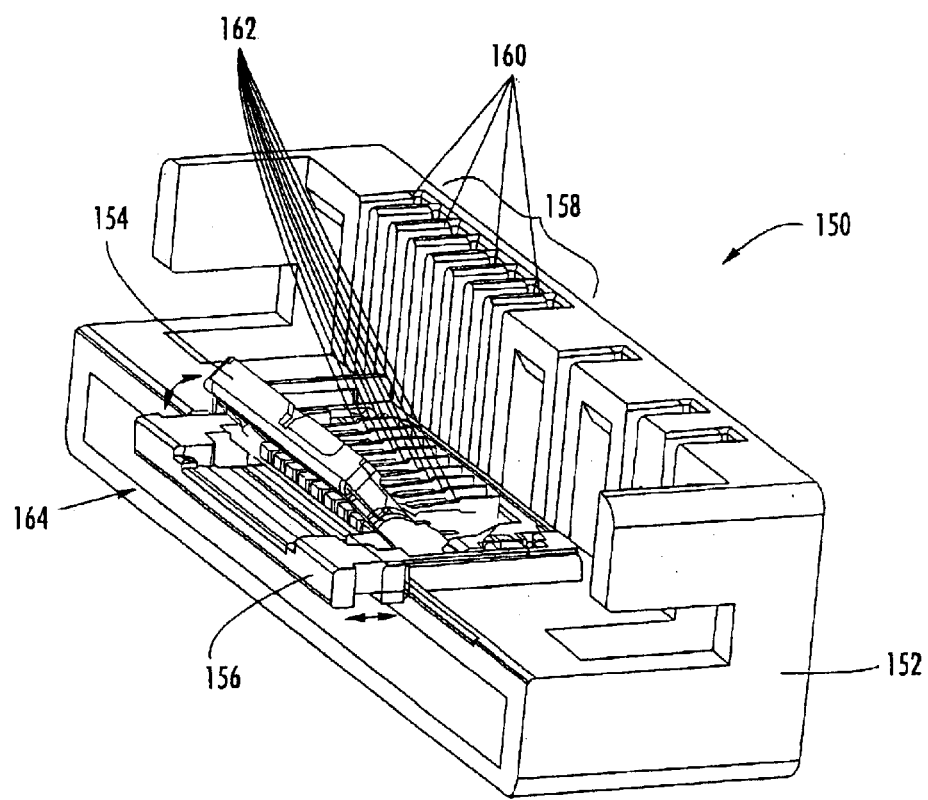
FIG. 4 is a perspective view of an internal connector of a connector assembly having a low insertion force connector in an open position according to further embodiments of the present invention.
Figure 5:
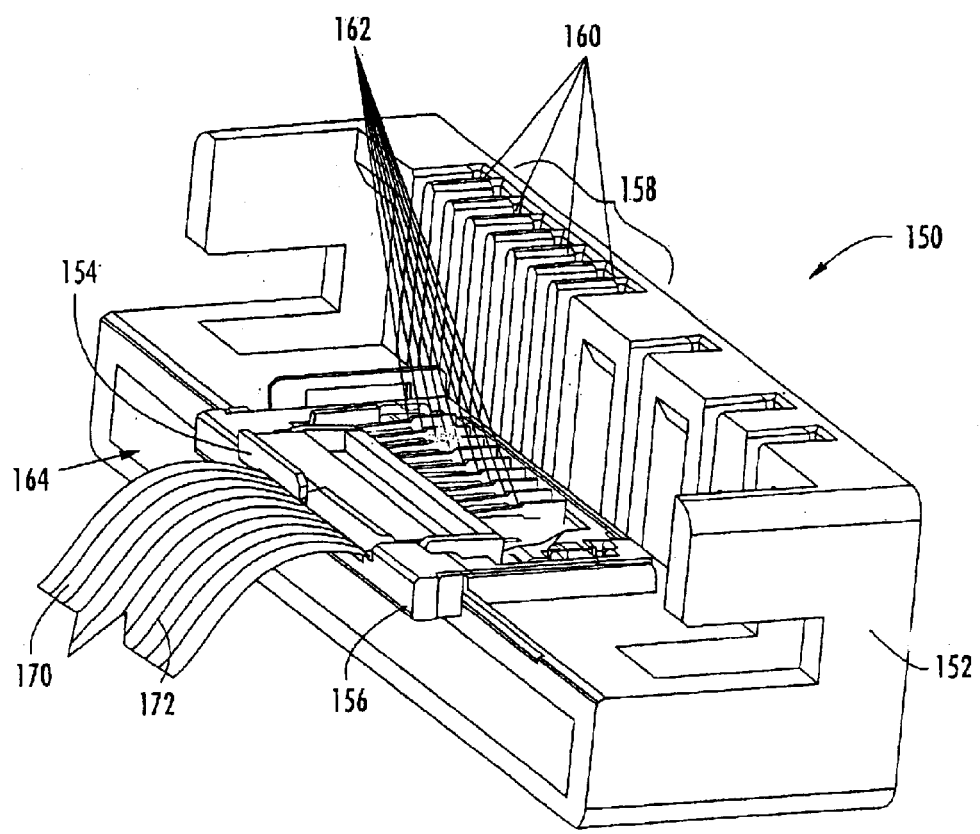
FIG. 5 is a perspective view of the connector assembly of FIG. 4 illustrating the low insertion force connector in a closed position electrically connected to a flexible printed circuit.

FIGS. 4 and 5 illustrate a connector assembly 150 including a low insertion force connector 164 in an open position (FIG. 4) and in a closed connection (FIG. 5). The low insertion force connector 164 is an example of an internal connector suitable for use as the internal connector 42 of FIG. 1. The connector assembly 150 has a housing 152 that can be positioned in a wall of the housing of a mobile terminal such that the low insertion force connector 164 extends into the housing of the mobile terminal and forms an electrical connection with a flexible printed circuit 170 (as shown in FIG. 5).

The low insertion force connector 164 includes a lower locking mechanism 156, an upper lever 154, and low insertion force conductive leads 162. The housing 152 includes slots 158 for containing auxiliary connector conductive leads 160. The auxiliary connector conductive leads 160 are configured to be electrically connected to a mating connector of the auxiliary device (not shown) and to the low insertion force conductive leads 162. In this configuration, the housing 152 rigidly couples the low insertion force connector leads 162 to the auxiliary connector side of the connector assembly 150. In some embodiments of the present invention, the housing 152 is a unitary molded polymeric body; however, any suitable material or housing configuration, including multiple housing pieces, can be used. As shown, the low insertion force conductive leads 162 are exposed. Alternatively, a cover may be placed over the low insertion force conductive leads 162, for example, to protect the leads 162 from wear.

As illustrated, the flexible printed circuit 170 includes leads 172 that form an electrical connection with the low insertion force conductive leads 162 when the upper lever 154 and the lower locking mechanism 156 are in the closed position (FIG. 5). In the closed position, the upper lever 154 and the lower locking mechanism 156 apply tangential force (a vertical direction as shown in FIG. 5) to the flexible printed circuit 170 to assist in the formation of the electrical connection between the circuit board leads 172 and the low insertion force conductive leads 162. In the open position shown in FIG. 4, the low insertion force connector 164 can release or receive the flexible printed circuit 170.

Any suitable low insertion force connector or zero insertion force connector can be used for the low insertion force connector 164. For example, the upper lever 154 can be omitted, and the electrical connection can be maintained using the lower locking mechanism 156, which may include a movable spring clip mechanism. Alternatively, the lower locking mechanism 156 can be omitted, and the upper lever 154 can be modified to lock from above into a closed position to maintain the electrical connection.

Figure 6:
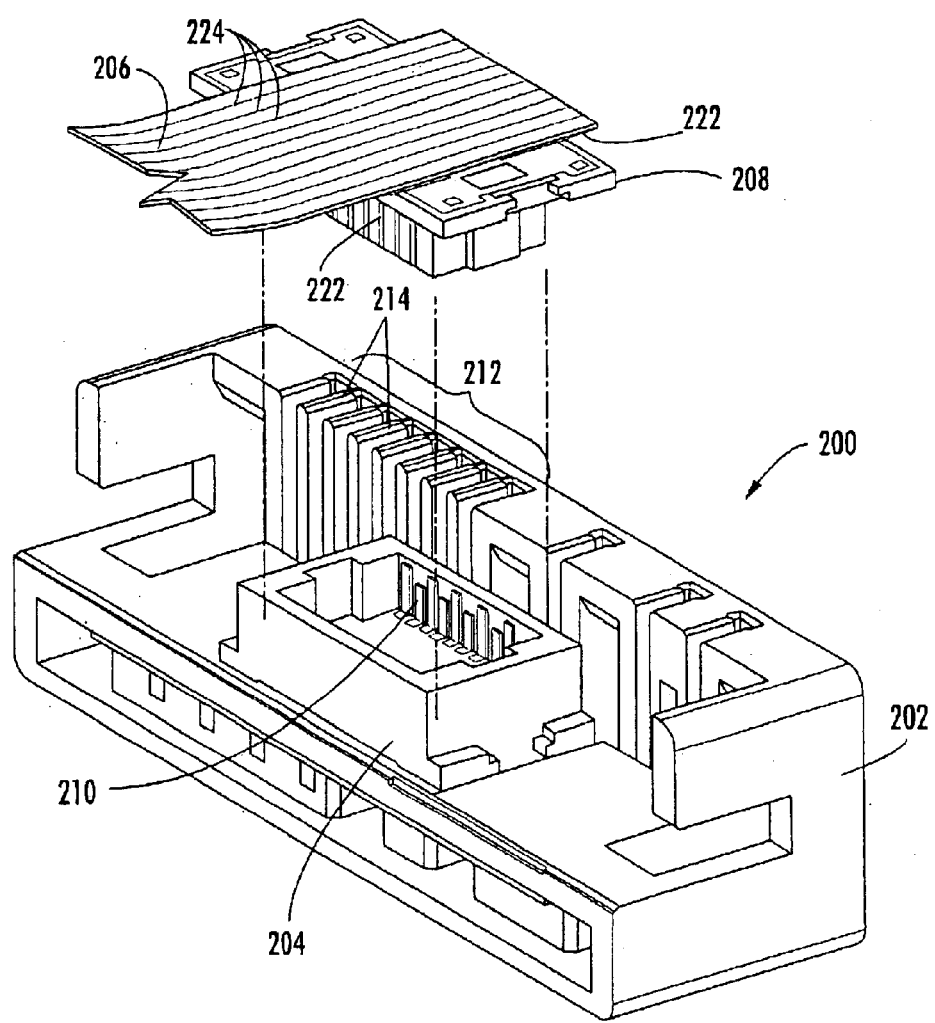
FIG. 6 is a perspective view of an internal connector of a connector assembly having a snap connector in an open position according to further embodiments of the present invention.
Figure 7:
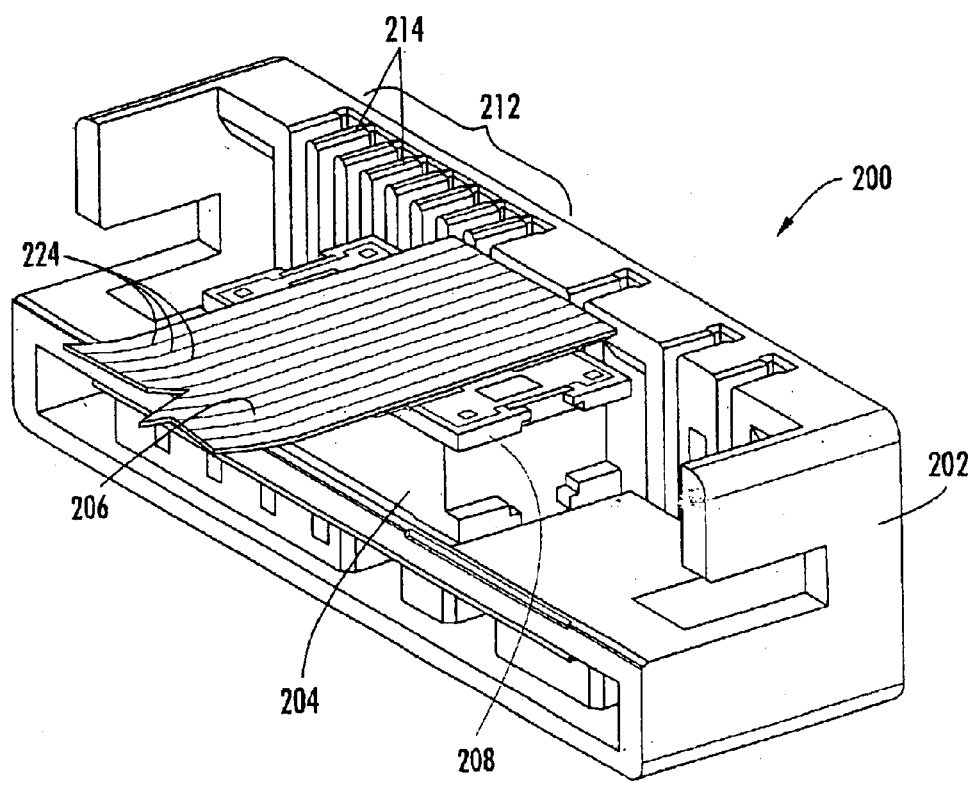
FIG. 7 is a perspective view of the connector assembly of FIG. 6 illustrating the snap connector in a closed position electrically connected to a flexible printed circuit.

FIGS. 6 and 7 illustrate a connector assembly 200 including a snap connector 204 in an open position (FIG. 6) and in a closed connection (FIG. 7). The snap connector 204 is an example of an internal connector suitable for use as the internal connector 42 of FIG. 1 in further embodiments of the present invention. The connector assembly 200 includes a unitary housing 202 that can be positioned in a wall of the housing of a mobile terminal. The housing 202 has slots 212 that include auxiliary conductive leads 214, which define auxiliary contact on an outside wall of the housing 202.

The snap connector 204 is molded as a unitary part of the housing 202 of the connector assembly 200. The snap connector 204 has lower snap connector conductive leads 210 that electrically connect to the auxiliary conductive leads 214 inside the housing 202. The snap connector 204 forms an electrical connection with a a flexible printed circuit 206. The flexible printed circuit 206 includes a mating snap connection 208 that includes upper snap connector conductive leads 222. The flexible printed circuit 206 includes flexible printed circuit leads 224 that are electrically connected to the upper snap connector conductive leads 222.

In the closed position shown in FIG. 7, the upper snap connector conductive leads 222 are electrically connected to the lower snap connector conductive leads 210. In this configuration, an electrical connection can be made from the auxiliary conductive leads 214 to the flexible printed circuit leads 224 through the lower snap connector conductive leads 222 and the upper snap connector conductive leads 210.

Figure 8:
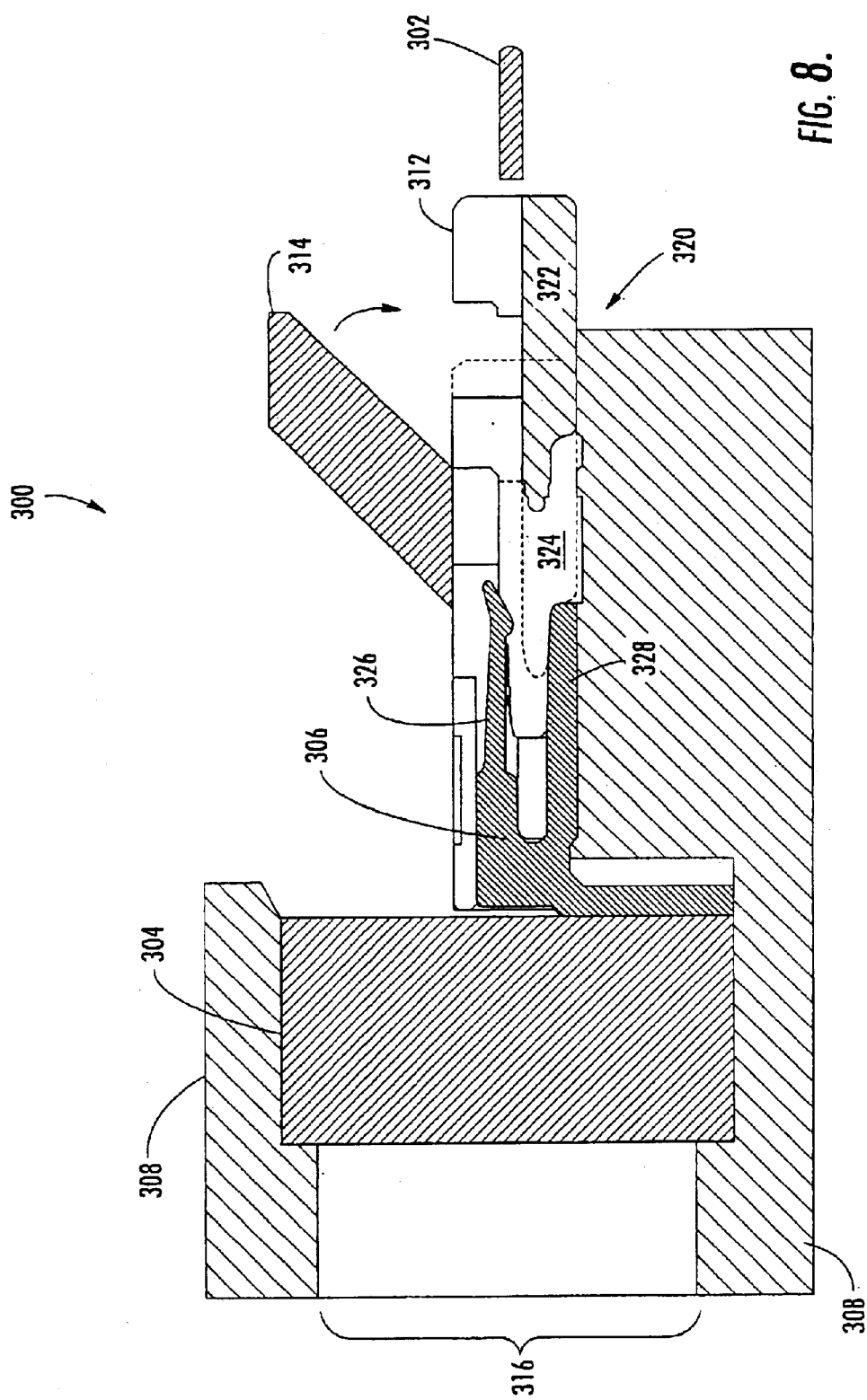
FIG. 8 is a cross sectional side view of a connector assembly having a low insertion force connector and an elastomeric contact according to still further embodiments of the present invention.

FIG. 8 illustrates further embodiments of a connector assembly 300 according to the present invention. The connector assembly 300 includes a housing 308 for housing a low insertion force connector 320. The low insertion force connector 320 can have a configuration similar to the low insertion force connector 164 described with respect to FIGS. 4 and 5; however, the low insertion force connector 320 has a lower locking mechanism 312 or an upper locking mechanism 314. The low insertion force connector 320 includes electrical contact(s) 306, some of which are shown in FIG. 8. The electrical contact(s) 306 have an upper portion 326 and a lower portion 328 that define an opening into which a flexible printed circuit 302 can be inserted. The lower locking mechanism 312 is movable between an open position 322 and a closed position 324 to hold the flexible printed circuit 302 in the electrical contact 306. The upper locking mechanism 314 can be moved downward to a closed position to apply a downward force to the electrical contact 306 to maintain an electrical connection to the flexible printed circuit 302.

The electrical contact 306 in the low insertion force connector 320 is electrically connected to an elastomer contact 304. The elastomer contact 304 is a compliant elastomer contact that can include a conductive material, such as gold or silver particles, suspended in an elastomeric material to provide a conductive path when axial pressure is applied to the elastomer. The elastomer contact 304 can have a plurality of conductive paths configured so that each conductive path is electrically connected to a different internal electrical contact, such as the electrical contact 306 illustrated in FIG. 8. An example of a suitable conductive elastomer material is a silicone rubber strip including sequentially spaced conductive and non-conductive (insulating) material to form a plurality of conductive paths. Another example of an elastomer material is a silicone elastomer core having embedded metal strips. Elastomer contacts are commercially available, for example, from Fujipoly Polymer Industries Co., Ltd., Tokyo, Japan under the trade name ZEBRA™, such as ZEBRA™ Gold 8000. Elastomer contacts may provide a relatively large number of conductive paths in a small area. As illustrated, the elastomer contact 304 can provide a seal between the opening 316 and the low insertion force connector 320 that may protect the low insertion force connector 320 and electrical circuits inside the portable housing from outside particles, such as dust and dirt contamination.

When the elastomer contact 304 is compressed, the conductivity of the elastomer contact 304 increases. The housing 308 defines an opening 316 into which an electrical contact (not shown), such as a contact from an accessory device for a mobile communications device, can be inserted. In this configuration, the elastomer contact 304 is compressed when an electrical contact is inserted into the opening 316 to provide conductivity to the electrical contact 306. Other suitable contacts can be used, such as metal spring contacts and flexible spring contacts.

Figure 9:
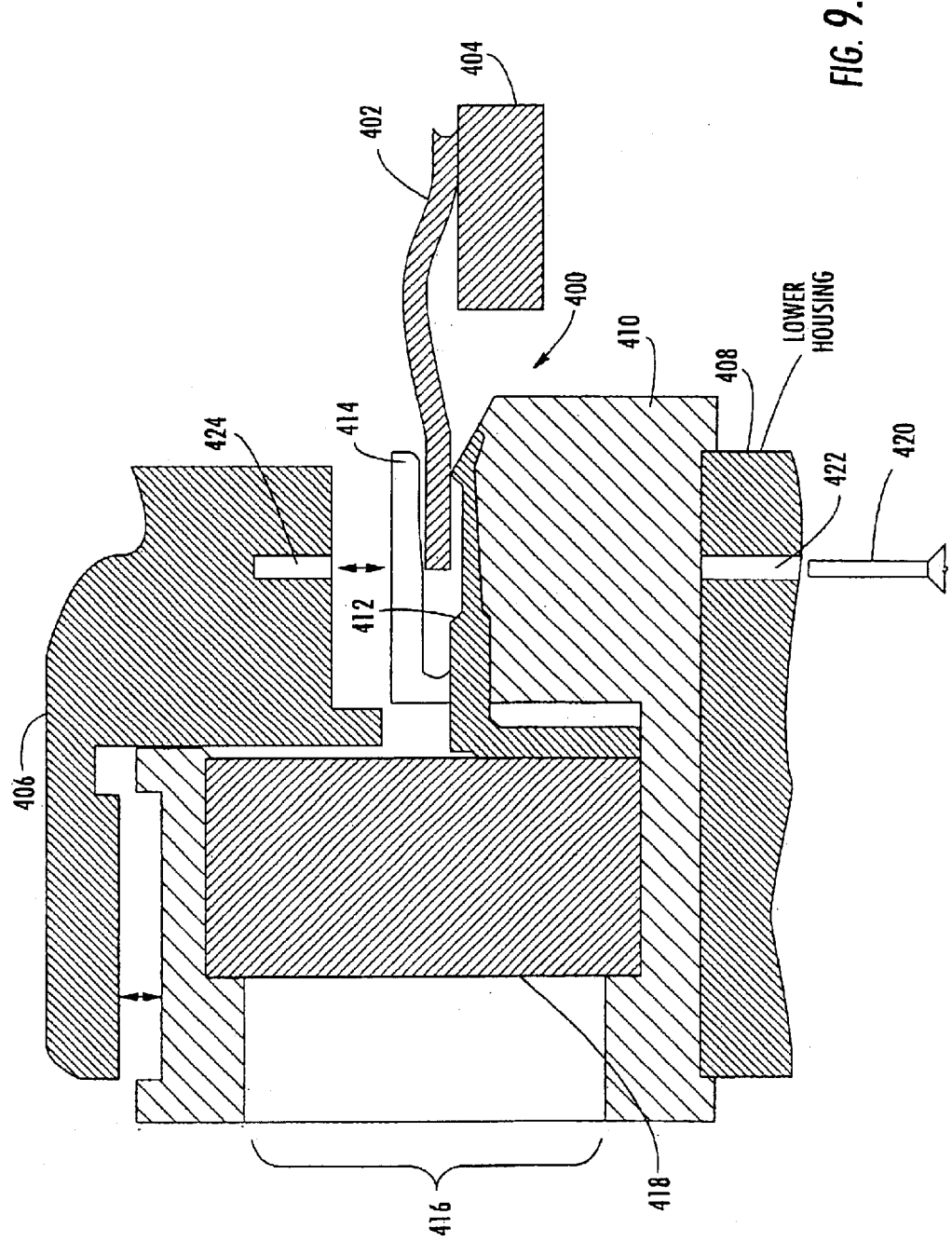
FIG. 9 is a cross sectional side view of a connector assembly having a low insertion force connector actuated by movement of a housing to hold a flexible printed circuit in the low insertion force connector according to yet further embodiments of the present invention.

Further embodiments of a connector assembly 400 according to embodiments of the present invention are shown in FIG. 9. The connector assembly 400 includes a housing 410 that defines an opening for an auxiliary device mating connector. An electrical contact 412 is positioned in the housing and is electrically connected to an elastomer contact 418. A guiding grove 414 is positioned adjacent the electrical contact 412 so that the guiding grove 414 and the electrical contact 412 together define an opening into which a flexible printed circuit 402 can be inserted. The flexible printed circuit 402 is electrically connected to an electrical circuit 404, for example, a printed circuit board in a portable electronic device, such as a radiotelephone, smart phone, or other hand held device.

The connector assembly 400 is placed on a lower portion 408 of the portable housing. An upper portion 406 of the portable housing can be placed over the connector assembly 400. The upper and lower housing 406, 408 can be the housing of a portable electronic device such as a radiotelephone, smart phone, or hand held device or a separate housing structure that is in turn, positioned in the housing. As illustrated, the lower housing 408 includes a fastener 420 that can be placed through openings 422 and 424 to fasten the upper housing 406 against the top of the connector assembly 400. In this configuration, the upper housing 406 places downward pressure on the flexible printed circuit 402 to hold the flexible printed circuit 402 in electrical contact with the electrical contacts 412.

Figure 10:
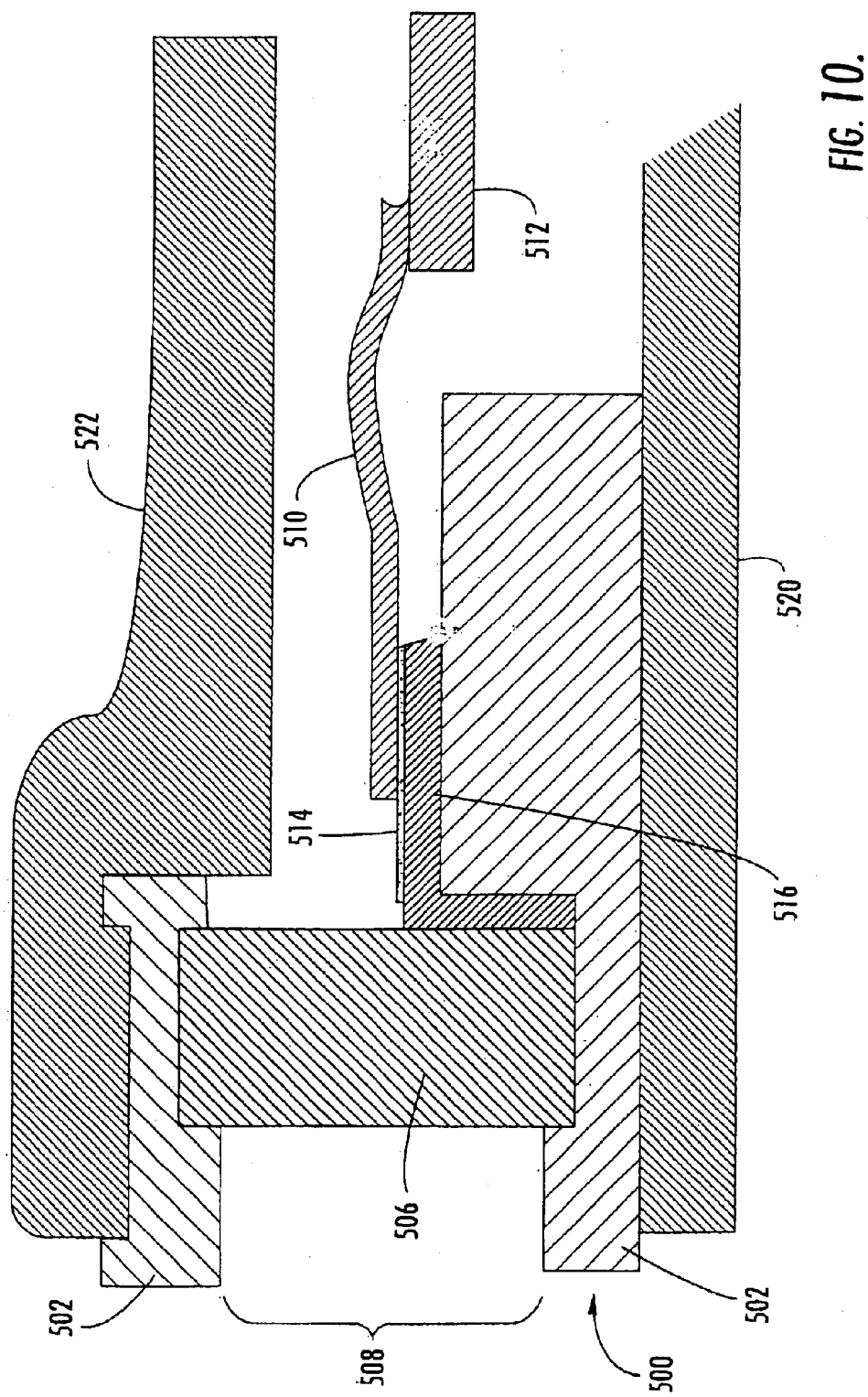
FIG. 10 is a cross sectional side view of a connector assembly electrically connected to a flexible printed circuit by conductive adhesive according to still further embodiments of the present invention.

FIG. 10 illustrates a connector assembly 500 according to the still further embodiments of the present invention. The connector assembly 500 is positioned between an upper housing 522 and a lower housing 520 of a portable electronic device. An electrical circuit 512 is placed between the upper housing 522 and the lower housing 520. A flexible printed circuit 510 provides an electrical connection between the electrical circuit 512 and the connector assembly 500.

The connector assembly 500 has a housing 502 that defines an opening 508 through which an elastomer contact 506 is accessible from the outside of the upper housing 522 and the lower housing 520. The elastomer contact 506 is electrically connected to an electrical contact 516 that provides an electrical connection between the flexible printed circuit 510 and the elastomer contact 506. A conductive adhesive 514 maintains the electrical connection between the flexible printed circuit 510 and the elastomer contact 506. The conductive adhesive 514 can be an anisotropic conductive adhesive such as 3M™ Z-Axis Adhesive Film from 3M Company, St. Paul, Minn., U.S.A.

Figure 11:
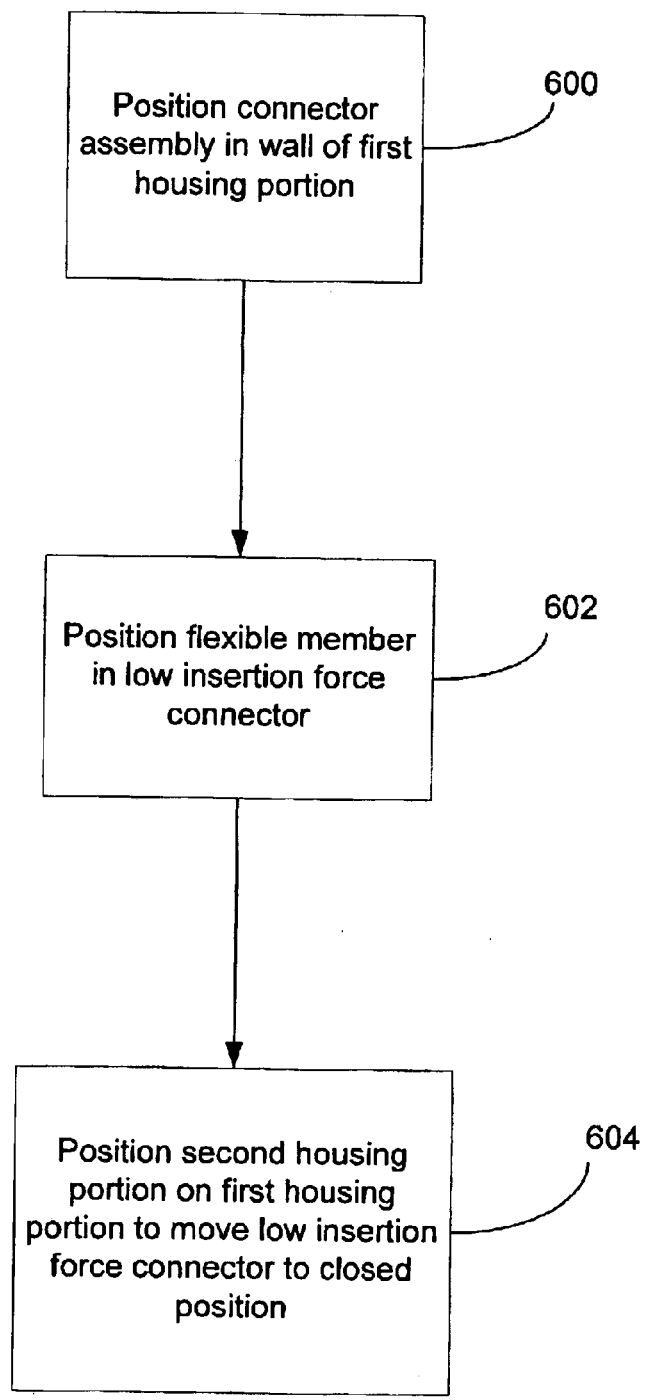
FIG. 11 is a flowchart illustrating operations for assembling a portable electronic device including a connector according to some embodiments of the present invention.

In some embodiments according to the present invention, portable devices can be assembled according to the operations illustrated in FIG. 11. At Block 600, a connector assembly, such as the connector assembly 400 shown in FIG. 9, is positioned in a wall of a housing portion, such as housing portion 408. At Block 602, a flexible connector is positioned in a low insertion force connector of the connector assembly. At Block 604, a second housing portion is positioned on the first housing portion to move the low insertion force to a closed position. For example, as shown in FIG. 9, the flexible printed circuit 402 is placed on electrical contacts 412. The upper housing portion 406 can be placed on the lower housing portion 408 to apply a downward pressure on the flexible printed circuit 402 to retain the flexible printed circuit 402 in electrical contact with the electrical contacts 412.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A portable electronic device comprising:
    a portable housing;
    an electrical circuit positioned in the housing; and
    a connector assembly positioned in a wall of the housing, the connector assembly comprising:
        an internal connector extending into the housing;
        an auxiliary connector rigidly coupled to the internal connector and accessible from outside the housing, the auxiliary connector being electrically connected to the internal connector; and
        a unitary molded polymeric body member that rigidly couples the internal connector and the auxiliary connector; and
    a flexible member that electrically connects the internal connector to the electrical circuit, the flexible member being configured to transmit less than about 10% of an external impact force on the connector assembly to the electrical circuit.

2. The device of claim 1 wherein the auxiliary connector further includes a power receptacle.

3. The device of claim 1 wherein the auxiliary connector further includes an audio receptacle.

4. The device of claim 1 wherein the connector assembly has a height of between about 3 mm and about 4 mm.

5. The device of claim 1 wherein the internal connector comprises an anisotropic conductive adhesive that forms an electrical connection between the flexible member and the internal connector.

6. The device of claim 1 wherein the device is a radiotelephone.

7. The device of claim 1 wherein the electrical circuit comprises a printed circuit board including a processor and a processor system bus and wherein the auxiliary connector comprises an interface between the system bus and an auxiliary device to operatively couple the auxiliary device to the processor.

8. The device of 7 wherein the device comprises a wireless terminal and wherein the printed circuit board further comprises a wireless communication circuit.

9. The device of claim 1 wherein the internal connector comprises a low insertion force connector.

10. The device of claim 9 wherein the low insertion force connector comprises a first part and a second part, the second part being movable between a first position retaining the flexible member in the low insertion force connector and a second position releasing the flexible member from the low insertion force connector.

11. The device of claim 10 wherein the low insertion force connector further comprises a locking mechanism configured to move the second part of the low insertion force connector between the first position and the second position.

12. The device of claim 9 wherein the flexible member comprises a flexible printed circuit.

13. The device of claim 12 wherein the low insertion force connector and the auxiliary connector each include a plurality of electrically isolated electrical contact points and wherein the connector assembly further comprises a plurality of conductive members extending between respective ones of the electrical contact points and having a first end defining an electrical contact in the low insertion force connector and a second end defining an associated electrical contact in the auxiliary connector.

14. The device of claim 13 wherein the plurality of conductive members comprise metal spring connectors.

15. The device of claim 14 wherein the electrical contact points in the auxiliary connector comprise flat spring connections defined by an end of the metal spring connectors.

16. The device of claim 13 wherein the electrical contact points in the auxiliary connector comprise compliant elastomer contacts.

17. The device of claim 16 wherein the compliant elastomer contacts comprise an elastomer material having gold particles suspended therein.

18. The device of claim 13 wherein the plurality of conductive members comprise conductive pathways in the polymeric body member formed by conductive elastomer interconnects.

19. The device of claim 18 further comprising a plurality of metallic electrical contacts electrically coupled to the ends of the conductive pathways adjacent the low insertion force connector to define the electrical contact points in the low insertion force connector.

20. A portable electronic device comprising:
a portable housing;
an electrical circuit positioned in the housing; and
a connector assembly positioned in a wall of the housing, the connector assembly comprising:
an internal connector extending into the housing; and
an auxiliary connector rigidly coupled to the internal connector and accessible from outside the housing, the auxiliary connector being electrically connected to the internal connector; and
a flexible member that electrically connects the internal connector to the electrical circuit, the flexible member being configured to transmit less than about 10% of an external impact force on the connector assembly to the electrical circuit;
wherein the internal connector comprises a snap connector.

21. The device of claim 20 wherein the snap connector and the auxiliary connector each include a plurality of electrically isolated electrical contact points and wherein the connector assembly further comprises a plurality of conductive members extending between respective ones of the electrical contact points and having a first end defining an electrical contact in the snap connector and a second end defining an associated electrical contact in the auxiliary connector.

22. A wireless terminal comprising:
a portable housing;
an electrical circuit positioned in the housing, the electrical circuit comprising a wireless communications circuit on a printed circuit board including a processor and a processor system bus;
a connector assembly having a height less than about 5 mm positioned in a wall of the housing, the connector assembly comprising:
an internal connector extending into the housing; and
an auxiliary connector rigidly coupled to the internal connector and accessible from outside the housing, the auxiliary connector being electrically connected to the internal connector;
wherein the internal connector and the auxiliary connector each include a plurality of electrically isolated electrical contact points and wherein the connector assembly further comprises a plurality of conductive members extending between respective ones of the electrical contact points and having a first end defining an electrical contact in the internal connector and a second end defining an associated electrical contact in the auxiliary connector, the plurality of conductive members comprising conductive pathways formed by conductive elastomer interconnects; and
a flexible member electrically connecting the internal connector to the electrical circuit, the flexible member being configured to transmit less than about 10% of an external impact force on the connector assembly to the electrical circuit.

23. The wireless terminal of claim 22 further comprising a plurality of metallic electrical contacts electrically coupled to the ends of the conductive pathways adjacent the internal connector to define the electrical contact points in the internal connector.

24. The wireless terminal of claim 22 wherein the elastomer interconnects comprise an elastomer material having gold particles suspended therein.

25. The wireless terminal of claim 22 wherein the flexible member comprises a flexible printed circuit.

26. The wireless terminal of claim 22 wherein the auxiliary connector includes a power receptacle.

27. The wireless terminal of claim 22 wherein the auxiliary connector includes an audio receptacle.

28. The wireless terminal of claim 22 wherein the connector assembly has a height of between about 3 mm and about 4 mm.

29. The wireless terminal of claim 22 wherein the internal connector comprises a low insertion force connector.

30. A wireless terminal comprising:
a portable housing;
an electrical circuit positioned in the housing, the electrical circuit comprising a wireless communications circuit on a printed circuit board including a processor and a processor system bus;
a connector assembly having a height less than about 5 mm positioned in a wall of the housing and extending into the housing, the connector assembly comprising:

a low insertion force connector;
an auxiliary connector accessible from outside the housing, the auxiliary connector being electrically connected to the low insertion force connector; and
a unitary molded polymeric body member that rigidly couples the low insertion force connector and the auxiliary connector;
a flexible member that electrically connects the low insertion force connector to the electrical circuit, the flexible member being configured to transmit less than about 10% of an external impact force on the auxiliary connector to the electrical circuit; and
wherein the low insertion force connector comprises a first part and a second part, the second part being movable between a first position retaining the flexible member in the low insertion force connector and a second position releasing the flexible connection member from the low insertion force connector.

31. The wireless terminal of claim 30 wherein the low insertion force connector further comprises a locking mechanism configured to move the second part of the low insertion force connector between the first position and the second position.

32. The wireless terminal of claim 30 wherein the flexible member comprises a flexible printed circuit.

33. The wireless terminal of claim 30 wherein the auxiliary connector further includes a power receptacle.

34. The wireless terminal of claim 30 wherein the auxiliary connector further includes an audio receptacle.

35. The wireless terminal of claim 30 wherein the connector assembly has a height of between about 3 mm and about 4 mm.

36. The wireless terminal of claim 30 wherein the wireless terminal is a radiotelephone.

37. A wireless terminal comprising:
a portable housing;
an electrical circuit positioned in the housing, the electrical circuit comprising a wireless communications circuit on a printed circuit board including a processor and a processor system bus;
a connector assembly having a height less than about 5 mm positioned in a wall of the housing and extending into the housing, the connector assembly comprising:
a low insertion force connector;
an auxiliary connector accessible from outside the housing, the auxiliary connector being electrically connected to the low insertion force connector; and
a unitary molded polymeric body member that rigidly couples the low insertion force connector and the auxiliary connector;
a flexible member that electrically connects the low insertion force connector to the electrical circuit, the flexible member being configured to transmit less than about 10% of an external impact force on the auxiliary connector to the electrical circuit;
wherein the low insertion force connector comprises a first part and a second part, the second part being movable between a first position retaining the flexible member in the low insertion force connector and a second position releasing the flexible connection member from the low insertion force connector; and wherein the low insertion force connector and the auxiliary connector each include a plurality of electrically isolated electrical contact points and wherein the connector assembly further comprises a plurality of conductive members extending between respective ones of the electrical contact points and having a first end defining an electrical contact in the low insertion force connector and a second end defining an associated electrical contact in the auxiliary connector.

38. The wireless terminal of claim 34 wherein the plurality of conductive members comprise metal spring connectors.

39. The wireless terminal of claim 38 wherein the electrical contact points in the auxiliary connector comprise flat spring connections defined by an end of the metal spring connectors.

40. The wireless terminal of claim 37 wherein the electrical contact points in the auxiliary connector comprise compliant elastomer contacts.

41. The wireless terminal of claim 40 wherein the compliant elastomer contacts comprise an elastomer material having gold particles suspended therein.

42. The wireless terminal of claim 37 wherein the plurality of conductive members comprise conductive pathways in the polymeric body member formed by conductive elastomer interconnects.

43. The wireless terminal of claim 42 further comprising a plurality of metallic electrical contacts electrically coupled to the ends of the conductive pathways adjacent the low insertion force connector to define the electrical contact points in the low insertion force connector.

44. A method for connecting a connector assembly having a low insertion force connector to a flexible member in a portable electronic device, the portable electronic device comprising a first housing portion and a second housing portion, the method comprising:
positioning a connector assembly in a wall of the first housing portion of the portable electronic device, the connector assembly comprising:
a low insertion force connector comprising a first part and a second part, the second part being movable between a closed position and an open position;
an auxiliary connector rigidly coupled to the low insertion force connector and accessible from outside the housing, the auxiliary connector being electrically connected to the low insertion force connector; and
a unitary molded polymeric body member that rigidly couples the internal connector and the auxiliary connector;
positioning a flexible member between the first part and the second part of the low insertion force connector; and
positioning the second housing portion of the portable electronic device on the first housing portion of the portable electronic device to move the second part of the low insertion force connector from the open position to the closed position to retain the flexible member in the low insertion force connector.

* * * * *